(12) United States Patent
Jacquel et al.

(10) Patent No.: US 9,217,056 B2
(45) Date of Patent: Dec. 22, 2015

(54) POLYMERS, THE PROCESS FOR THE SYNTHESIS THEREOF AND COMPOSITIONS COMPRISING SAME

(71) Applicant: ROQUETTE FRERES, Lestrem (FR)

(72) Inventors: Nicolas Jacquel, Lambersart (FR); Rene Saint-Loup, Lomme (FR); Francoise Fenouillot-Rimlinger, L'Isle d'Abeau (FR); Jean-Pierre Pascault, Villeurbanne (FR); Alain Rousseau, Saint Priest (FR)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 14/388,854

(22) PCT Filed: Mar. 29, 2013

(86) PCT No.: PCT/FR2013/050700
§ 371 (c)(1),
(2) Date: Sep. 29, 2014

(87) PCT Pub. No.: WO2013/144525
PCT Pub. Date: Oct. 3, 2013

(65) Prior Publication Data
US 2015/0057424 A1 Feb. 26, 2015

(30) Foreign Application Priority Data
Mar. 30, 2012 (FR) ...................... 12 52914

(51) Int. Cl.
| | | |
|---|---|---|
| *C08G 63/00* | (2006.01) |
| *C08G 63/16* | (2006.01) |
| *C08J 5/18* | (2006.01) |
| *C08G 63/181* | (2006.01) |
| *C08G 63/85* | (2006.01) |
| *C08G 63/02* | (2006.01) |

(52) U.S. Cl.
CPC .............. *C08G 63/16* (2013.01); *C08G 63/181* (2013.01); *C08G 63/85* (2013.01); *C08J 5/18* (2013.01); *C08J 2367/02* (2013.01)

(58) Field of Classification Search
CPC ....................................................... C08G 63/64
USPC ........... 524/111; 528/271, 272, 279; 264/537; 428/35.7
See application file for complete search history.

(56) References Cited

U.S. PATENT DOCUMENTS

| | | |
|---|---|---|
| 2,551,731 A | 5/1951 | Drewitt et al. |
| 2013/0095272 A1* | 4/2013 | Carman et al. ............. 428/36.92 |

FOREIGN PATENT DOCUMENTS

| | | |
|---|---|---|
| CN | 102372845 | 3/2012 |
| WO | WO 2007/052847 | 5/2007 |
| WO | WO 2009/135921 | 11/2009 |
| WO | WO 2011/147806 | 12/2011 |

OTHER PUBLICATIONS

Gomes, M. et al. "Synthesis and Characterization of Poly(2,5-furan dicarboxylate)s Based on a Variety of Diols" *Journal of Polymer Science Part A: Polymer Chemistry* Sep. 1, 2011, pp. 3759-3768, vol. 49, No. 17.
Written Opinion in International Application No. PCT/FR2013/050700, Jun. 7, 2013, pp. 1-5.

* cited by examiner

*Primary Examiner* — Terressa Boykin
(74) *Attorney, Agent, or Firm* — Saliwanchik, Lloyd & Eisenschenk

(57) ABSTRACT

The present invention relates to copolymers, in particular poly(butylenesuccinate-co-furanoate) (PBSF) copolymers, which have advantageous mechanical properties, and also to polymeric compositions comprising them. It also relates to a process for preparing these polymers.

20 Claims, 3 Drawing Sheets

POLYMERS, THE PROCESS FOR THE SYNTHESIS THEREOF AND COMPOSITIONS COMPRISING SAME

CROSS-REFERENCE TO RELATED APPLICATION

This application is the U.S. national stage application of International Patent Application No. PCT/FR 2013/050700, filed Mar. 29, 2013.

FIELD OF THE INVENTION

The present invention relates to copolymers, notably of poly(butylene succinate-co-furanoate) (PBSF), which have interesting mechanical properties. It also relates to a process for preparing these polymers, as well as to compositions comprising same.

TECHNOLOGICAL BACKGROUND OF THE INVENTION

One of the important preoccupations today in the field of polymers is to supply polymers of natural origin (biosourced) and/or that are biodegradable. For this purpose, it is interesting to be able to use biosourced monomers in the synthesis of the polymers.

The polyesters are mainly divided into two classes with different properties: the aliphatic polyesters, such as poly (butylene succinate) (PBS), poly(butylene succinate-co-adipate) (PBSA) or poly-ϵ-caprolactone (PCL), and the aromatic polyesters, such as poly(ethylene terephthalate) (PET), poly (trimethylene terephthalate) (PTT) or poly(butylene terephthalate) (PBT).

The aliphatic polyesters generally have melting points close to those of the polyolefins, which allows among other things their application in the fields of films and packaging, where biodegradability is obviously an advantage for single-use applications. However, they are very sensitive to hydrolysis. Some of the monomers used for synthesizing the aliphatic polyesters may be biosourced, for example succinic acid and 1,4-butanediol, used for synthesis of PBS. As for the aromatic polyesters, they have mechanical properties that are not readily compatible with the target applications of the polyolefins. Moreover, the high proportion of aromatic monomers in the composition of these polyesters greatly reduces the hydrophilicity of these resins and annihilates their biodegradable character.

To maintain mechanical properties close to those of the polyolefins while increasing the capacity of the aliphatic polyesters to resist hydrolysis, aliphatic-aromatic polyesters have been developed. This makes it possible to overcome some of the drawbacks of the purely aliphatic or purely aromatic polyesters.

From this perspective, PBAT (poly(butylene adipate-co-terephthalate)), marketed by BASF under the name Ecoflex®, was developed in order to meet the increasing need in Europe for biodegradable polymers, notably polymers intended for biodegradable packaging, making it possible to replace the polyolefins, at least in certain applications. PBAT also has excellent mechanical properties, notably in terms of elongation and of breaking stress.

Nevertheless, the amount of PBAT produced cannot at present meet all the needs of the market, which have been amplified by the legislation of certain European countries, which are increasingly requiring the use of biodegradable polymers in disposable packaging materials. Moreover, PBAT is petroleum-sourced at present, which has a considerable influence on its carbon footprint and therefore reduces the environmental benefit from using it in disposable packaging. Moreover, to achieve the improved mechanical properties and in particular the elongation properties, it is necessary to add relatively large amounts of terephthalic acid units.

Application WO 2009/135921 A1 describes biodegradable aliphatic-aromatic polyesters, in which the aromatic unit can be a furanoate unit. The polyesters described comprise a quantity of furanoate units, relative to the sum of the moles of units derived from diacids, well above 35 mol %. It is not described that this polyester can be formed by blow molding. Now, the applicant has ascertained that the polyesters described in that document, and notably the one in example 1, cannot be formed by blow molding as their crystallization rate is insufficient (see example 4.2 of the present document). Now, there is a need to obtain such polymers, as forming of polymers by blow molding, notably for forming polymer films of large dimensions, is an industrial necessity.

In this context, the applicant has demonstrated that it is possible to create other aliphatic-aromatic polyesters having properties close to, or even above, those of PBAT and formable by blow molding. These are in particular polyesters of poly(butylene succinate-co-furanoate) (PBSF) that comprise units derived from butanediol, from succinic acid and from 2,5-furandicarboxylic acid (FDCA), which may be of biosourced origin.

The mechanical properties of these polymers mean they can be used advantageously for manufacturing films and/or packaging.

Moreover, the applicant has devised a process for synthesis of these polymers which has, surprisingly, undeniable advantages over the processes described for the synthesis of other aliphatic-aromatic polyesters.

SUMMARY OF THE INVENTION

The invention relates to a polymer comprising units derived from monomers comprising a 2,5-furandicarboxylic acid, at least one aliphatic diacid and at least one aliphatic diol, in which said polymer comprises:
 a mole fraction of units derived from 2,5-furandicarboxylic acid, relative to the sum of the moles of units derived from aliphatic diacids and from 2,5-furandicarboxylic acid, in the range from 2.5 to 35%, for example from 5 to 30%, advantageously from 6 to 25%, preferably from 7 to 20%;
 the mole fraction of the sum of the units derived from 2,5-furandicarboxylic acid and from aliphatic diacids, relative to the total of the units, being between 40 and 60%;
 the mole fraction of the sum of the units derived from aliphatic diols, relative to the total of the units, being between 40 and 60%.

In these ranges of mole fractions, and particularly in the preferred ranges, the properties of the polymers, notably their mechanical properties, are improved relative to the aliphatic polymers not comprising units derived from 2,5-furandicarboxylic acid. In particular, the polymers have an improved modulus and elongation at break, which means they can be used in applications that are more varied than the conventional aliphatic polyesters. These polymers may also have good biodegradability and/or good hydrolysis behavior. Moreover, the particular choice of amounts and constituent monomers makes it possible to obtain polymers that are readily formable by blow molding.

The aliphatic diols and diacids may be linear, branched or cyclic. They may also be saturated or unsaturated.

Advantageously, the aliphatic diacids are linear saturated diacids. They may be selected from succinic acid and adipic acid, preferably succinic acid.

Advantageously, the aliphatic diols are linear saturated diols. They may be selected from ethylene glycol and 1,4-butanediol, preferably 1,4-butanediol.

Advantageously, the sum of the units derived from 2,5-furandicarboxylic acid, from aliphatic diacids and from aliphatic diols is above 90 mol % of the total units of the polymer, preferably above 95%, and more preferably is equal to 100%.

The invention also relates to a process for preparing a polymer, comprising:
- a step of esterification between monomers comprising at least one aliphatic diacid, for example succinic acid, 2,5-furandicarboxylic acid, and at least one aliphatic diol, for example 1,4-butanediol, to form oligomers, and
- a step of coupling, by transesterification, of the oligomers formed in the first step, to form a polymer.

This process offers the advantage of forming the polymer more quickly than an identical process in which the aliphatic diacid and the aliphatic diol are reacted without 2,5-furandicarboxylic acid.

The present invention also relates to the polymers, preferably the polymers of poly(butylene succinate-co-furanoate) PBSF, obtained according to this process. Another object also relates to polymer compositions comprising at least one polymer according to the invention. The invention also relates to films of these polymers or of these compositions.

DETAILED DESCRIPTION OF THE INVENTION

The invention relates to a polymer comprising units derived from monomers comprising a 2,5-furandicarboxylic acid, at least one aliphatic diacid comprising 4 to 10 carbon atoms and at least one aliphatic diol comprising 2 to 8 carbon atoms, in which said polymer comprises:
- a mole fraction of units derived from 2,5-furandicarboxylic acid, relative to the sum of the moles of units derived from aliphatic diacids and from 2,5-furandicarboxylic acid, in the range from 2.5 to 35%, for example from 5 to 30%, advantageously from 6 to 25%, preferably from 7 to 20%;
- the mole fraction of the sum of the units derived from 2,5-furandicarboxylic acid and from aliphatic diacids, relative to the total of the units, being between 40 and 60%;
- the mole fraction of the sum of the units derived from aliphatic diols, relative to the total of the units, being between 40 and 60%.

In these ranges of mole fractions, and particularly in the preferred ranges, the properties of the polymers, notably their mechanical properties, are improved relative to the polymers not comprising units derived from 2,5-furandicarboxylic acid.

"Unit derived from 2,5-furandicarboxylic acid" denotes, in the present invention, a unit of formula

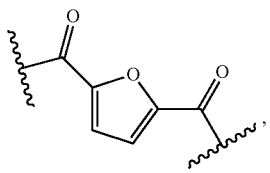

the zigzags denoting the bonds by which the unit is joined to the rest of the polymer, whether this unit is actually derived from 2,5-furandicarboxylic acid, or is derived from another reagent such as an ester of this acid.

"Unit derived from aliphatic diacid" denotes, in the present invention, a unit of formula

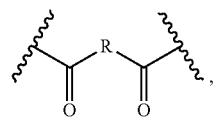

the aliphatic group R being a saturated or unsaturated aliphatic group that may be linear, branched or cyclic, the zigzags denoting the bonds by which the unit is joined to the rest of the polymer, whether this unit is actually derived from the aliphatic diacid of formula COOH—R—COOH, or is derived from another reagent such as an ester of this acid.

Advantageously, R comprises from 2 to 8 carbon atoms, preferably 2, 3 or 4 carbon atoms, in particular R comprises 2 carbon atoms.

Advantageously, the aliphatic diacid comprises from 4 to 10 carbon atoms, preferably 4, 5 or 6 carbon atoms, in particular R comprises 2 carbon atoms.

"Unit derived from aliphatic diol" denotes, in the present invention, a unit of formula

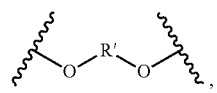

the aliphatic group R' being a saturated or unsaturated aliphatic group that may be linear, branched or cyclic, the zigzags denoting the bonds by which the unit is joined to the rest of the polymer, whether this unit is actually derived from the aliphatic diol of formula OH—R'—OH, or is derived from another reagent.

Advantageously, R' comprises from 2 to 8 carbon atoms, preferably 2, 3 or 4 or 6 carbon atoms, in particular R' comprises 4 carbon atoms. The aliphatic diol comprises the same number of carbon atoms as R'.

"Aliphatic group" denotes, in the present invention, an acyclic or cyclic, linear or branched, saturated or unsaturated hydrocarbon group, excluding the aromatic compounds.

"Aliphatic-aromatic polyester" denotes, in the present invention, polyesters comprising aliphatic units and aromatic units, notably units derived from 2,5-furandicarboxylic acid, the aromatic units being in amounts below 50 mol % relative to the total units of the polymer.

Preferably, the aliphatic diacid is a saturated aliphatic diacid.

As an example of saturated cyclic aliphatic diacid, we may mention 1,4-cyclohexanedioic acid.

Advantageously, the aliphatic diacids are saturated linear aliphatic diacids. They may be selected from succinic acid, glutaric acid, adipic acid, pimelic acid, suberic acid, azelaic acid and sebacic acid. Preferably, the aliphatic diacid is selected from succinic acid and adipic acid, more preferably succinic acid.

Preferably, the aliphatic diol is a saturated diol.

As an example of saturated cyclic aliphatic diol, we may mention 1,4-cyclohexanedimethanol (CHDM). Advantageously, the aliphatic diols are linear saturated diols. They may be selected from ethylene glycol, 1,3-propanediol and 1,4-butanediol, 1,5-pentanediol and 1,6-hexanediol, preferably 1,4-butanediol.

Advantageously, the sum of the units derived from 2,5-furandicarboxylic acid, from aliphatic diacids and from aliphatic diols is above 90 mol % of the total units of the polymer, preferably above 95%, and more preferably is equal to 100%.

Advantageously, the polymers according to the invention are obtained from biosourced aliphatic diols and/or aliphatic diacids.

Synthesis of the Polymers According to the Invention

These polymers may be manufactured by the conventional polycondensation processes.

Preferably, the polymers according to the invention are synthesized by a process comprising at least 2 steps (steps 1 and 2) described below.

The invention also relates to the process comprising steps 1 and 2 for synthesis of the polymers according to the invention.

Steps 1 and 2 of the process according to the invention are described below with monomers of succinic acid, of 2,5-furandicarboxylic acid and of 1,4-butanediol, but the present invention also covers the process implemented by replacing succinic acid with any aliphatic diacid as described in the present invention, and/or 1,4-butanediol with any aliphatic diol as described in the present invention.

"Aliphatic diacid" denotes, in the present invention, a compound of formula COOH—R—COOH, group R being as defined above.

"Aliphatic diol" denotes, in the present invention, a compound of formula OH—R'—OH, group R' being as defined above.

Moreover, a process implemented by replacing the aliphatic diacid with one or more monoesters or diesters of this aliphatic diacid, or with a mixture of esters of the aliphatic diacid with the diacid, is also covered by the present invention. In particular, the esters of diacids usable in the process according to the invention may be the ethyl or methyl diester of the aliphatic diacid, preferably of succinic acid.

Preferably, the aliphatic diacid is not replaced with an ester in the process of the invention.

Moreover, a process implemented by replacing 2,5-furandicarboxylic acid with one or more monoesters or diesters of this acid, or with a mixture of esters of 2,5-furandicarboxylic acid with the acid, is also covered by the present invention. In particular, the esters usable in the process according to the invention may be the ethyl or methyl diester of 2,5-furandicarboxylic acid.

Preferably, 2,5-furandicarboxylic acid is not replaced with an ester in the process of the invention.

Step 1:

The first step of the process for synthesis of the polymers according to the invention is an esterification between monomers of succinic acid, of 2,5-furandicarboxylic acid, and of 1,4-butanediol, to form oligomers.

For example, step 1 may be carried out according to the following scheme:

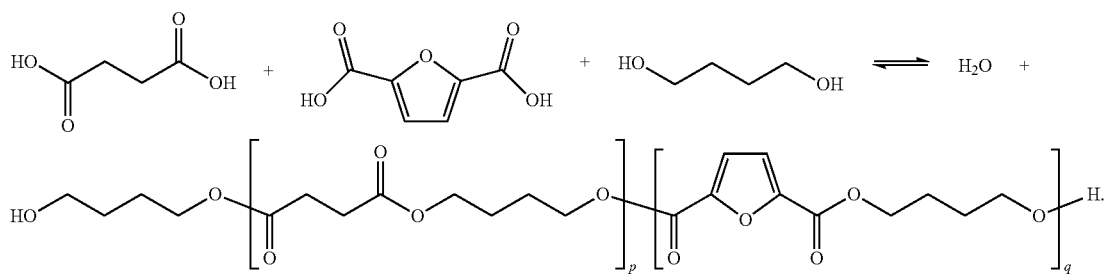

Step 1 is carried out with partial or complete removal of the water formed during the reaction of esterification between a molecule of succinic or 2,5-furandicarboxylic acid, and a molecule of 1,4-butanediol.

Step 1 may be carried out in the presence of a catalytic system consisting of one or more esterification catalysts. Preferably, the catalytic system is inert with respect to water. The catalytic system may notably be used for accelerating the reaction kinetics. This catalytic system may be introduced at the start of step 1. This catalytic system may comprise, preferably be, para-toluenesulphonic acid (PTSA) and/or methanesulphonic acid (MSA).

Step 1 is carried out in the presence of a number of equivalents of 1,4-butanediol, relative to the total of the succinic and/or 2,5-furandicarboxylic acids, that may vary widely, notably between 0.5 and 10 equivalents, advantageously between 0.8 and 2 equivalents, and preferably between 0.9 and 1.2 equivalents of 1,4-butanediol relative to the total of the succinic and/or 2,5-furandicarboxylic acids. Preferably, the first step is carried out in the presence of an excess of 1,4-butanediol relative to the total of the succinic and/or 2,5-furandicarboxylic acids, for example between 1.02 and 1.2 equivalents.

Step 1 is carried out with a mole fraction of 2,5-furandicarboxylic acid, relative to the sum of the moles of succinic acid and of 2,5-furandicarboxylic acid, that may vary widely, notably between 2.5 and 80%, quite particularly between 2.5 and 50%. In one embodiment of the invention, the mole fraction of 2,5-furandicarboxylic acid is less than or equal to 25%, preferably greater than or equal to 5%, preferably strictly above 5%, or even greater than or equal to 10%. Preferably, the mole fraction of 2,5-furandicarboxylic acid is less than or equal to 22%, or even 20%.

Depending on the operating conditions of the synthesis process, the amounts of units that are polymerized and are therefore present in the polymer obtained by the process may vary. Thus, the molar amounts of monomers introduced into the reactor generally diverge from the amounts present in the final polymer synthesized. For illustration of this phenomenon, reference may be made to the examples of the present application.

A person skilled in the art will easily be able to modify the operating conditions, in particular the amounts of monomers introduced into the reactor, in order to obtain polymers having the molar amounts of each desired unit.

Step 2:

The second step of the process for synthesis of the polymers according to the invention is coupling, by transesterification, of the oligomers formed in the first step to form a polymer. For example, step 2 may be carried out according to the following scheme:

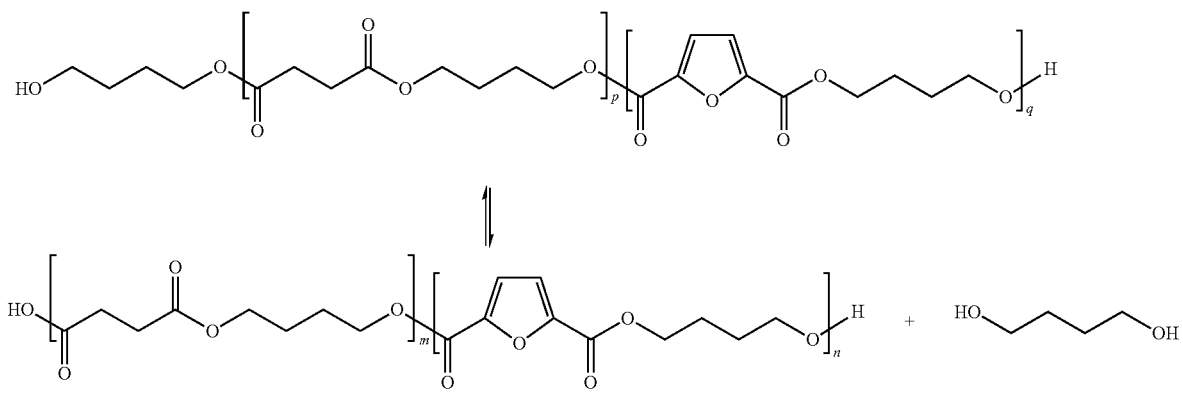

The proportion of each of the units present in the polymer may be determined conventionally by $^1$H NMR (nuclear magnetic resonance) from calculation of the ratio of the integrals of the different peaks. $^1$H NMR analysis of the copolymers containing 2,5-furandicarboxylic acid may be carried out on an NMR spectrometer equipped with a $^1$H probe. The resonance frequency of the spectrometer may vary from 100 to 1000 MHz. In order to be analyzed, the polymer samples may be dissolved beforehand in a suitable deuterated solvent, for example deuterated chloroform. A person skilled in the art will easily adapt the acquisition conditions to obtain the spectrum. For example, a number of acquisitions of 512 may be performed with a relaxation time of at least 1 second.

The oligomers formed at the end of step 1 preferably have OH terminations.

The numbers of units p and q are directly related to the number-average molecular weight of the oligomer. The number-average molecular weight of the oligomer may vary widely, notably as a function of the characteristics desired for the oligomer, and generally ranges from 1000 to 5000 g/mol, preferably from 2000 to 4000 g/mol.

A person skilled in the art optimizes the reaction conditions so that the oligomers obtained at the end of step 1 possess the desired molecular weight.

Step 1 is carried out advantageously under inert atmosphere. Step 1 may take place at atmospheric pressure or under slight pressure, for example between 1 and 4 bar. The temperature during step 1 is advantageously between 190 and 235° C., preferably between 200° C. and 225° C. (inclusive).

During step 1, it is also possible to introduce other monomers capable of reacting with the 1,4-butanediol, succinic acid and/or 2,5-furandicarboxylic acid, such as monomers of alpha-hydroxy acid. Preferably, these monomers are introduced into the reactor in amounts of less than 10 mol %, or even less than 5 mol % relative to the total number of moles of the monomers introduced. In one embodiment of the invention, no monomer of alpha-hydroxy acid is introduced into the reactor at the start of or during step 1.

In one embodiment of the invention, the only monomers introduced into the reactor at the start of or during step 1 are monomers of succinic acid, of 2,5-furandicarboxylic acid, and of 1,4-butanediol.

Step 2 is preferably carried out in the presence of a catalytic system consisting of one or more transesterification catalysts. The catalytic system may be used for accelerating the reaction kinetics or to attain higher molecular weights. This catalytic system may be introduced at the start of or during step 1. The catalytic system may alternatively be added at the start of or during step 2, especially if it is sensitive to the water formed in step 1. Preferably, the catalytic system is introduced at the start of step 2. This catalytic system may comprise, preferably be, a catalyst based on zirconium or titanium, preferably based on zirconium.

The second step is advantageously carried out at reduced pressure, notably at a pressure below 5 mbar, preferably at a pressure between 0.01 and 1 mbar, for example between 0.5 and 1 mbar.

The second step is carried out with partial or complete removal of the 1,4-butanediol produced during coupling of two oligomers.

The temperature during step 2 is advantageously between 200 and 260° C., preferably between 210 and 230° C. (inclusive).

In the present invention, when "partial or complete removal" of a constituent resulting from a reaction is carried out, it is preferred that at least 90% of the moles of this constituent are removed from the reactor, or even at least 95%, or even at least 99%. Removal may be carried out continuously during the reaction, for example by distillation.

The numbers of units m and n are directly related to the number-average molecular weight of the polymer. The number-average molecular weight of the polymer obtained at the end of step 2 may be above 20 000 g/mol, advantageously above 30 000 g/mol, preferably above 35 000 g/mol, more preferably above 40 000 g/mol. It is generally below 150 000 g/mol, for example below 100 000 g/mol.

In these ranges of molecular weights, and particularly in the preferred ranges, the properties of the polymers, notably their mechanical properties, are improved.

The molecular weight may be determined by conventional methods, for example by size exclusion chromatography. The molecular weights of the polymers may be estimated by size exclusion chromatography equipped with a refractometric detector. The polymer is dissolved in a suitable solvent, for example 1,1,1,3,3,3-hexafluoro-2-propanol. The samples may have a concentration of 1 g/L. They may be eluted at a flow rate of 0.75 mL/min. The average molecular weights (Mn and Mw) are determined using calibration with polymethyl methacrylate standards.

The expression "at the start" of a step signifies a time when the reagents of the step have not begun to react. The expression "during" a step signifies a time when reaction between the reagents has already begun, but has not yet ended. It is a time point at which a proportion of the reagents have already been transformed into product, and/or into intermediate.

One object of the invention is a process for preparing polymers comprising steps 1 and 2 described above.

One object of the invention is a process for preparing polymers, comprising:
  a step of esterification between monomers of a saturated linear diacid, preferably of succinic acid, of 2,5-furandicarboxylic acid, and of a linear saturated diol, preferably of 1,4-butanediol, to form oligomers, and
  a step of coupling by transesterification of the oligomers formed in the first step to form a polymer.

Catalyst

The catalytic systems and catalysts usable for each of the polymerization steps of the process of the invention may be or comprise any catalyst used conventionally for each of the steps of polymerization of PBS.

A catalyst useful for the first step of esterification may be selected in particular from para-toluenesulphonic acid (PTSA) and methanesulphonic acid (MSA).

The catalysts that may be used during the second step of transesterification are for example those described in paragraphs [0090] to [0094] of patent EP 1882712 B1. As examples, we may mention the catalysts, organic or inorganic, comprising a chemical element selected from titanium, germanium, antimony, tin, bismuth, hafnium, magnesium, aluminum, lithium or a mixture of these catalysts. It may be for example germanium oxide, zirconium tetra-n-butylate or titanium tetra-n-butylate. The amount of catalyst used may be between 50 ppm and 1500 ppm by weight of element relative to the total weight of the polymer obtained, preferably between 100 and 1200 ppm. In one embodiment of the invention, the catalyst comprises zirconium as element, and preferably it is zirconium tetra-n-butylate. Preferably, the amount of zirconium catalyst is between 600 and 1200 ppm by weight of element relative to the total weight of the polymer obtained. The use of zirconium notably makes it possible to limit the coloration of the composite obtained.

Succinic Acid

The succinic acid used for carrying out a synthesis process according to the invention is preferably derived from agricultural resources, or biosourced, but may also be petroleum-sourced. For example, succinic acid may be produced by fermentation using renewable nonfossil raw materials, notably according to the teaching of application WO 2011064151.

In the case when the process employs an ester of succinic acid, the latter is also preferably derived from agricultural resources, or biosourced, but may also be petroleum-sourced.

1,4-Butanediol

The 1,4-butanediol used for carrying out a synthesis process according to the invention is preferably derived from the hydrogenation of biosourced succinic acid or from fermenting processes using the appropriate microorganisms. It is also possible to use petroleum-sourced 1,4-butanediol.

2,5-Furandicarboxylic Acid

The 2,5-furandicarboxylic acid used for carrying out a synthesis process according to the invention is preferably derived from agricultural resources, or biosourced, but may also be petroleum-sourced.

In the case when the process employs an ester of 2,5-furandicarboxylic acid, the latter is also preferably derived from agricultural resources, or biosourced, but may also be petroleum-sourced.

Contrary to what was expected, the applicant found that the addition of monomers of 2,5-furandicarboxylic acid to the monomers of succinic acid and of 1,4-butanediol used for synthesizing PBS makes it possible to increase the rate of transesterification considerably, while maintaining a constant polymerization temperature (step of the process). The effect expected on adding an aromatic comonomer in the synthesis of an aliphatic polymer would rather be a slowing of the polymerization kinetics.

The kinetics of the transesterification reaction may for example be evaluated by monitoring the torque of the mechanical stirrer. In fact, the transesterification reaction will lead to an increase in molecular weight of the polymer. The latter is accompanied by an increase in viscosity, which may be monitored by measuring the torque exerted on the shaft of the mechanical stirrer in the molten reaction mixture.

The process according to the invention consequently offers undeniable advantages over the processes for preparing aliphatic-aromatic polymers of the prior art, since the kinetics of transesterification is, unexpectedly, accelerated by the presence of the aromatic monomer.

Moreover, the process according to the invention makes it possible to obtain polymers of higher molecular weight than in other processes for synthesis of aliphatic-aromatic polymers, notably as the presence of the aromatic monomer does not have the expected effect of making the reaction more difficult to carry out. Thus, transesterification may be conducted without any problems until high molecular weights are obtained, if desired.

Mechanical Properties of the Polymers According to the Invention

The uses envisaged for the polymers according to the invention mainly comprise uses for which the mechanical properties are important. Among the uses envisaged for the polymers according to the invention, we may mention for example the formation of films.

The polymers according to the invention, and the polymers obtained by a process according to the invention, have interesting mechanical properties. For example, the polymers according to the invention have a high elongation at break. In particular, the elongation at break of the polymers according to the invention, in particular the PBSF polymers according to the invention, is higher than that of PBS. Moreover, for an identical number of aromatic units, the elongation at break of the PBSF polymers according to the invention is also increased relative to that of the other aliphatic-aromatic polyesters, notably poly(butylene succinate-co-terephthalate) (PBST) and poly(butylene adipate-co-terephthalate) (PBAT). Moreover, PBSF, the polyester according to the invention, is particularly interesting as its mechanical properties at high temperature are better than those of the other polymers according to the invention, and notably better than those of the poly(butylene sebacate-co-furanoate)s. This is connected with a higher melting point of PBSF, at identical molar amount of aliphatic and aromatic monomers, relative to that of the poly(butylene sebacate-co-furanoate)s. The melting point of the polymer according to the invention is preferably above 80° C., very preferably above 90° C. The melting point may be determined according to the operating conditions of the examples.

Another object of the present invention is a polymer, notably a polymer of poly(butylene succinate-co-furanoate) PBSF, obtainable by a process according to the invention.

Another object of the present invention is a polymer, notably a polymer of poly(butylene succinate-co-furanoate) PBSF, obtained by a process according to the invention.

Another object of the present invention is a polymer composition comprising at least one polymer according to the invention, in particular obtained by a process according to the invention.

"Polymer composition" means a composition comprising one or more polymers according to the invention, preferably synthesized by a process according to the invention, optionally mixed with other components, such as for example polymers or additives used conventionally in the field of plastics technology.

In one embodiment, the polymer composition according to the invention comprises no other components than the polymer or polymers according to the invention.

In another embodiment, the polymer composition according to the invention comprises, as the only polymers, at least one polymer according to the invention, preferably obtained by a process according to the invention.

Preferably, the polymer composition according to the invention consists of at least one polymer according to the invention, preferably obtained by a process according to the invention.

The polymers or the polymer compositions according to the invention may be used for manufacturing any type of object. They may be formed in various ways, notably by extrusion, by extrusion blowing (blow molding) or extrusion blow molding of film bubbles or hollow bodies, by injection, by textile spinning or by calendering. Forming by blow molding makes it possible to produce films of thermoplastic polymer of large dimensions.

The polymers and the polymer compositions according to the invention are particularly suitable for forming by blow molding.

One object of the invention is a process for blow molding a film of a polymer or of a polymer composition according to the invention. The blow molding process comprises forming them by blow molding, also called "film blowing".

This process, well known by a person skilled in the art, is generally carried out by continuously feeding the bubble formed by the polymer in the molten state using an extruder; this is also called film extrusion or film blow molding.

In fact, the polymer according to the invention can be processed particularly well using these techniques, in contrast to the polymers of application WO 2009/135921 A1.

Another object of the invention is a film of polymer or of polymer composition according to the invention, preferably obtained by the blow molding process according to the invention.

The polymer or the composition may therefore be in the form of film. The film according to the invention generally has a thickness between 5 and 1000 μm, preferably between 10 and 50 μm.

The examples that follow are supplied for purposes of illustrating, but not limiting, the embodiments of the present invention.

EXAMPLES

Figure 1:
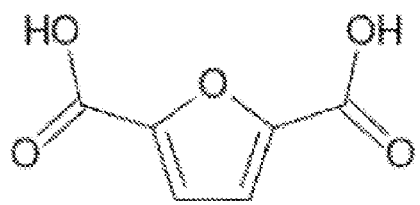
FIG. 1:
Chemical formula of 2,5-furandicarboxylic acid.

The properties of the polymers were investigated by the following techniques:

The quantity of terminal carboxyl functions (acid value, AV) is determined by potentiometric titration. The polymer is first dissolved in chloroform, and is then titrated with a solution of sodium hydroxide in methanol. The result is then expressed as the potassium hydroxide equivalent (in mg/g) required to neutralize the solution.

The melt viscosities (MFR, melt flow rate) of the various polyesters are examined using a grader of the Ats Farr extrusion plastometer type. All the measurements were carried out according to standard ASTM D 1238-82 at 190° C. with a weight of 2.16 kg.

Moreover, the reduced viscosity in solution is evaluated using an Ubbelohde capillary viscosimeter at 25° C. in a mixture of equal weights of phenol and ortho-dichlorobenzene after dissolution of the polymer at 130° C. with stirring. For these measurements, the concentration of polymer introduced is 0.5 g/L.

The molecular weights of the polymers are estimated by size exclusion chromatography in 1,1,1,3,3,3-hexafluoro-2-propanol. The samples with a concentration of 1 g/L are eluted at a flow rate of 0.75 mL/min, the signals are then recorded by an RI detector of the type Agilent-RI-1100a). Finally the average molecular weights (Mn and Mw) are determined using calibration with polymethyl methacrylate standards.

The thermal properties (glass transition temperature, crystallization temperature, melting point and degree of crystallinity) are determined by differential calorimetry with scanning at 10° C./min (DSC, Differential Scanning calorimetry).

The mechanical properties of the films obtained by extrusion blow molding are examined in uniaxial tension at a speed of 50 mm/min. The test specimens of the dumb-bell type used have the following dimensions: thickness of about 30 to 50 μm, width of 4 mm and nominal length of 10 mm.

$^1$H NMR analysis of the copolymers containing 2,5-furandicarboxylic acid is carried out on a Bruker 400 MHz spectrometer equipped with a QNP probe. For analysis, the polymer samples were first dissolved in deuterated chloroform.

The compostability of certain samples was determined according to standard ISO 14855-1:2005, simulating a process of intensive aerobic composting. For these tests, the sample is mixed with an inoculum consisting of a mature compost in a ratio of 1 to 6 (w/w). During the process, the temperature is maintained at 58±1° C. and the humidity is adjusted to 50%. The pH, as well as the continuous aeration of the medium are also monitored and controlled. The amount of $CO_2$ released by the reactor is measured using an infrared analyzer. The degree of biodegradation is then calculated by comparing the cumulative amount of $CO_2$ released with the level of organic carbon initially contained in the sample.

Example 1

Process According to the Invention

A polymer according to the invention is synthesized by a two-step polycondensation reaction in a 7.5 L reactor equipped with a heating system, a mechanical stirrer with measurement of the torque AC, a distillation column, a vacuum line and a nitrogen gas inlet. The reactor is charged with 16 mol of a mixture of succinic acid and 2,5-furandicarboxylic acid in the desired proportions and 16.8 mol of 1,4-butanediol (excess of diol of 5 mol %). The reaction mixture is heated at 225° C. under pressure of 2 bar of nitrogen and stirred at a constant speed (150 rev/min). A mixture of water and tetrahydrofuran (THF) corresponding to dehydration of the butanediol is distilled from the reactor. The yield in the first step of esterification is evaluated as a function of the amount of water collected.

In the second step, the pressure is reduced to 0.7 mbar for 120 min and the temperature is increased to 230° C. The $Zr(OBu)_4$ catalyst is added when the pressure is at about 20 mbar, in a proportion such that the molar ratio of the sum of the diacids to the catalyst is $1.8 \times 10^{-3}$. These low pressure conditions are maintained until the desired torque AC is obtained (measured by the stirrer). Finally, a polymer rod is cast via the reactor bottom valve, cooled in a temperature-controlled tank of water and cut into granules of about 15 mg.

Example 2

Preparations of Polybutylene Succinate and Poly(Butylene Succinate-Co-Furanoate)s, According to the Invention and Comparative Example 2.1

Comparative Example

The polymer is synthesized according to the process described in example 1, starting from 1514.0 g of 1,4-butanediol and 1889.0 g of succinic acid. At the end of esterification, 11.586 g of zirconium tetra-n-butylate are added as catalyst. The transesterification step is carried out at 0.7 mbar and 230° C. for 250 minutes.

The resin thus obtained has a melt viscosity of 35 g/10 min (190° C., 2.160 kg), a reduced viscosity in solution of 201 mL/g and a number-average molecular weight of 59 000 g·mol$^{-1}$. The acidity of the final polymer is 51 µeq·g$^{-1}$. The melting point of the polymer is 115° C., its glass transition temperature is −30° C., its crystallization temperature is 59° C. and its degree of crystallinity is 31%.

Example 2.2

Polymer According to the Invention

The polymer is synthesized according to the process described in example 1, starting from 1514.0 g of 1,4-butanediol, 1795.0 g of succinic acid and 124.9 g of 2,5-furandicarboxylic acid. At the end of esterification, 11.586 g of zirconium tetra-n-butylate are added as catalyst. The transesterification step is carried out at 0.7 mbar and 230° C. for 40 minutes.

The resin thus obtained has a melt viscosity of 43 g/10 min (190° C., 2.160 kg), a reduced viscosity in solution of 191 mL/g and a number-average molecular weight of 58 200 g·mol$^{-1}$. The acidity of the final polymer is 71 µeq·g$^{-1}$. The melting point of the polymer is 111° C., its glass transition temperature is −31° C., its crystallization temperature is 63° C. and its degree of crystallinity is 27%. The amount of 2,5-furanic acid introduced into the polymer, quantified by NMR, is 2.7 mol % relative to the sum of the diacids.

Example 2.3

Polymer According to the Invention

The polymer is synthesized according to the process described in example 1, starting from 1514.0 g of 1,4-butanediol, 1700.5 g of succinic acid and 249.7 g of 2,5-furandicarboxylic acid. At the end of esterification, 11.586 g of zirconium tetra-n-butylate are added as catalyst. The transesterification step is carried out at 0.7 mbar and 230° C. for 50 minutes.

The resin thus obtained has a melt viscosity of 48 g/10 min (190° C., 2.160 kg), a reduced viscosity in solution of 179 mL/g and a number-average molecular weight of 59 200 g·mol$^{-1}$. The acidity of the final polymer is 76 µeq·g$^{-1}$. The melting point of the polymer is 103° C., its glass transition temperature is −24° C., its crystallization temperature is 50° C. and its degree of crystallinity is 24%. The amount of 2,5-furanic acid introduced into the polymer, quantified by NMR, is 8.1 mol % relative to the sum of the diacids.

Example 2.4

Polymer According to the Invention

The polymer is synthesized according to the process described in example 1, starting from 1514.0 g of 1,4-butanediol, 1511.6 g of succinic acid and 499.5 g of 2,5-furandicarboxylic acid. At the end of esterification, 11.586 g of zirconium tetra-n-butylate are added as catalyst. The transesterification step is carried out at 0.7 mbar and 230° C. for 90 minutes.

The resin thus obtained has a melt viscosity of 42 g/10 min (190° C., 2.160 kg), a reduced viscosity in solution of 167 mL/g and a number-average molecular weight of 61 700 g·mol$^{-1}$. The acidity of the final polymer is 76 µeq·g$^{-1}$. The melting point of the polymer is 90° C., its glass transition temperature is −17° C., and its degree of crystallinity is 14%. The amount of 2,5-furanic acid introduced into the polymer, quantified by NMR, is 15.0 mol % relative to the sum of the diacids.

Example 2.5

Comparative Example

The polymer is synthesized according to the process described in example 1, starting from 1514.0 g of 1,4-butanediol, 755.8 g of succinic acid and 1498.5 g of 2,5-furandicarboxylic acid. At the end of esterification, 11.586 g of zirconium tetra-n-butylate are added as catalyst. The transesterification step is carried out at 0.7 mbar and 230° C. for 150 minutes.

The resin thus obtained has a reduced viscosity in solution of 22 mL/g and a number-average molecular weight of 1250 g·mol$^{-1}$. The melting point of the polymer is 54° C., its glass transition temperature is −21° C., and its degree of crystallinity is 15%. The amount of 2,5-furanic acid introduced into the polymer, quantified by NMR, is 50.6 mol % relative to the sum of the diacids.

The polymer thus synthesized could not be used in extrusion blow molding as it does not have an adequate behavior of the melt and crystallization rate.

The mechanical properties and the amounts of 2,5-furandicarboxylic acid actually introduced into the polymer chains are given in Table 1.

The mole fractions of the sum of the units derived from 2,5-furandicarboxylic acid and from aliphatic diacids, relative to the total of the units, are all between 40 and 60% and are not included in Table 1.

The mole fractions of the sum of the units derived from aliphatic diols, relative to the total of the units, are all between 40 and 60% and are not included in Table 1.

Example 3

Comparative Examples, Preparation of Other Aliphatic-Aromatic Polymers

Example 3.1

The polymer is synthesized according to the process described in example 1, starting from 1514.0 g of 1,4-butanediol, 1700.5 g of succinic acid and 265.8 g of terephthalic acid. At the end of esterification, 11.586 g of zirconium tetra-n-butylate are added as catalyst. The transesterification step is carried out at 0.7 mbar and 230° C. for 100 minutes.

The resin thus obtained has a reduced viscosity in solution of 29 mL/g. The melting point of the polymer is 106° C., its glass transition temperature is −42° C., its crystallization temperature is 59° C. and its degree of crystallinity is 37%.

The polymer thus formed comparatively with various PBSFs synthesized in the same conditions (transesterification temperature and catalyst), has a very low reduced viscosity, synonymous with a molecular weight that is also low. Example 3.1 in FIG. 3 offers good confirmation of this effect. The polymer thus synthesized could not be used in extrusion blowing as it does not have adequate melt behavior and crystallization rate.

Therefore in the next example 3.2, the synthesis conditions were modified so as to be able to form a polymer having a higher molecular weight (increase in temperature).

Example 3.2

The polymer is synthesized according to the process described in example 1, starting from 1514.0 g of 1,4-butanediol, 1795 g of succinic acid and 132.9 g of terephthalic acid. At the end of esterification, 11.586 g of zirconium tetra-n-butylate are added as catalyst. The transesterification step is carried out at 0.7 mbar and 250° C. for 36 minutes.

The resin thus obtained has a melt viscosity of 37 g/10 min (190° C., 2.160 kg), a reduced viscosity in solution of 200 mL/g and a number-average molecular weight of 52 400 g·mol$^{-1}$. The acidity of the final polymer is 70 µeq·g$^{-1}$. The melting point of the polymer is 110° C., its glass transition temperature is −31° C., its crystallization temperature is 50° C. and its degree of crystallinity is 29%.

The amount of terephthalic acid introduced into the polymer, quantified by NMR, is 4.1 mol % relative to the sum of the diacids.

Example 3.3

To form the polymer, the catalyst was also changed, according to the following process:

The polymer is synthesized according to the process described in example 1, starting from 1514.0 g of 1,4-butanediol, 1700.5 g of succinic acid and 265.8 g of terephthalic acid. At the end of esterification, 7.831 g of titanium tetra-n-butylate are added as catalyst. The transesterification step is carried out at 0.7 mbar and 250° C. for 240 minutes.

The resin thus obtained has a melt viscosity of 40 g/10 min (190° C., 2.160 kg), a reduced viscosity in solution of 174 mL/g and a number-average molecular weight of 49 700 g·mol$^{-1}$. The acidity of the final polymer is 45 µeq·g$^{-1}$. The melting point of the polymer is 105° C., its glass transition temperature is −28° C., its crystallization temperature is 34° C. and its degree of crystallinity is 25%.

The amount of terephthalic acid introduced into the polymer, quantified by NMR, is 7.5 mol % relative to the sum of the diacids.

Example 3.4

To form the polymer, the polymerization temperature and the amount of catalyst were further increased, according to the following process:

The polymer is synthesized according to the process described in example 1, starting from 1514.0 g of 1,4-butanediol, 1511.6 g of succinic acid and 531.6 g of terephthalic acid. At the end of esterification, 15.661 g of titanium tetra-n-butylate are added as catalyst. The transesterification step is carried out at 0.7 mbar and 270° C. for 320 minutes.

The resin thus obtained has a melt viscosity of 55 g/10 min (190° C., 2.160 kg), a reduced viscosity in solution of 132 mL/g and a number-average molecular weight of 34 900 g·mol$^{-1}$. The acidity of the final polymer is 58 µeq·g$^{-1}$. The melting point of the polymer is 97° C., its glass transition temperature is −27° C., its crystallization temperature is 20° C. and its degree of crystallinity is 21%.

The amount of terephthalic acid introduced into the polymer, quantified by NMR, is 13.9 mol % relative to the sum of the diacids.

Example 4

Preparations of Poly(Butylene Sebacate-Co-Furanoate)s

Example 4.1

Polymer According to the Invention

The polymer is synthesized according to the process described in example 1, starting from 1514.0 g of 1,4-butanediol, 2588.2 g of sebacic acid and 499.5 g of 2,5-furandicarboxylic acid. At the end of esterification, 11.237 g of titanium tetra-n-butylate are added as catalyst. The transesterification step is carried out at 0.7 mbar and 230° C. for 59 minutes.

The resin thus obtained has a reduced viscosity in solution of 183 mL/g and a number-average molecular weight of 51 500 g·mol$^{-1}$. The melting point of the polymer is 57° C., its glass transition temperature is −42° C., and its degree of crystallinity is 33%. The amount of 2,5-furanic acid introduced into the polymer, quantified by NMR, is 18.8 mol % relative to the sum of the diacids.

The final polymer could be formed by extrusion blow molding. However, the final copolymer has a low melting point (Tm=57° C.), making it unusable for certain applications. Its temperature resistance is lower than that of the copolymers based on succinic acid.

Example 4.2

Comparative Example

This polymer is synthesized according to the process described in example 1 of patent application WO2009135921 A1, starting from 2019.3 g of 1,4-butanediol, 1294.1 g of sebacic acid and 1766.4 g of dimethylfuran dicarboxylate. The mixture is heated to 200° C., stirring continuously. This temperature is maintained for one hour, then 100 ppm of tetra-orthobutyl titanate (Tyzor) are added. Following this addition, the temperature rose to 235° C. in 3 hours. A mixture of methanol, water and tetrahydrofuran is recovered during this esterification step.

At the end of esterification, 1000 ppm of tetra-orthobutyl titanate (Tyzor) is added again, then the pressure is reduced to 1 mbar. The temperature is then increased to 240° C. These conditions of vacuum and temperature are maintained for 120 minutes.

The resin thus obtained has a reduced viscosity in solution of 159 mL/g and a number-average molecular weight of 59 090 g·mol$^{-1}$. The melting point of the polymer is 101° C., its glass transition temperature is −12° C., and its degree of crystallinity is 9%. The amount of 2,5-furanic acid introduced into the polymer, quantified by NMR, is 58.0 mol % relative to the sum of the diacids.

The polymer thus synthesized does not have a sufficient crystallization rate for forming by extrusion blow molding.

Table 1 below presents the values of modulus, breaking stress and elongation at break in two directions (longitudinal and transverse relative to the axis of the bubble formed) for different polymer films. The polymers P(BS-co-BF) are according to the invention.

The mole fractions of the sum of the units derived from 2,5-furandicarboxylic acid and from aliphatic diacids, relative to the total of the units, are all between 40 and 60% and are not included in Table 1.

The mole fractions of the sum of the units derived from aliphatic diols, relative to the total of the units, are all between 40 and 60% and are not included in Table 1.

TABLE 1

| Copolymer | Ex. | Comonomer in polymer (mol %) | Comonomer in reactor (mol %) | Modulus (MPa) | | Breaking stress (MPa) | | Elongation at break (%) | |
|---|---|---|---|---|---|---|---|---|---|
| | | | | Long. | Trans. | Long. | Trans. | Long. | Trans. |
| PBS [comparative] | Ex 2.1 | 0 | — | 148 | 145 | 19 | 17 | 232 | 170 |
| P(BS-co-BT) [comparative] | Ex 3.1 | — | 10 | Not blowable | | | | | |
| | Ex 3.2 | 4.1 | 5 | 97 | 100 | 30 | 25 | 1111 | 1026 |
| | Ex 3.3 | 7.5 | 10 | 94 | 83 | 28 | 17 | 1096 | 875 |
| | Ex 3.4 | 13.9 | 20 | 62 | 87 | 15 | 21 | 696 | 799 |
| P(BS-co-BF) [invention] | Ex 2.2 | 2.7 | 5 | 84 | 172 | 23 | 14 | 952 | 174 |
| | Ex 2.3 | 8.1 | 10 | 75 | 77 | 18 | 20 | 1125 | 1027 |
| | Ex 2.4 | 15.0 | 20 | 76 | 115 | 23 | 21 | 1400 | 1423 |
| P(BS-co-BF) [comparative] | Ex 2.5 | 50.6 | 60 | Not blowable | | | | | |
| P(BSeb-co-BF) [invention] | Ex 4.1 | 18.8 | 20 | 49 | 61 | 17 | 19 | 1793 | 2240 |
| P(BSeb-co-BF) [comparative] | Ex 4.2 | 58.0 | 60 | Not blowable | | | | | |
| P(BA-co-BT)$^a$ [comparative] | — | 49.0 | — | 20 | 11 | 20 | 19 | 1192 | 2108 |

$^a$product marketed by BASF SE (Germany) grade F Blend C1200

Comparison of the Compostability of the Various Aliphatic-Aromatic Polyesters

Table 2 (below) gives the 90% degradation times of certain samples in composting conditions. It clearly shows that the samples of poly(butylene succinate-co-furanoate) comply with standard EN 13432 in terms of biodegradability.

TABLE 2

| Copolymer | Ex. | t (days) to 90% degradation of the sample | Compostability according to standard EN 13432 |
|---|---|---|---|
| Cellulose [reference] | | 49 | Yes |
| P(BS-co-BF) [invention] | Ex 2.2 | 103 | Yes |
| | Ex 2.3 | 83 | Yes |
| | Ex 2.4 | 66 | Yes |
| P(BA-co-BT)$^a$ [comparative] | — | 130 | Yes |

Figure 2:
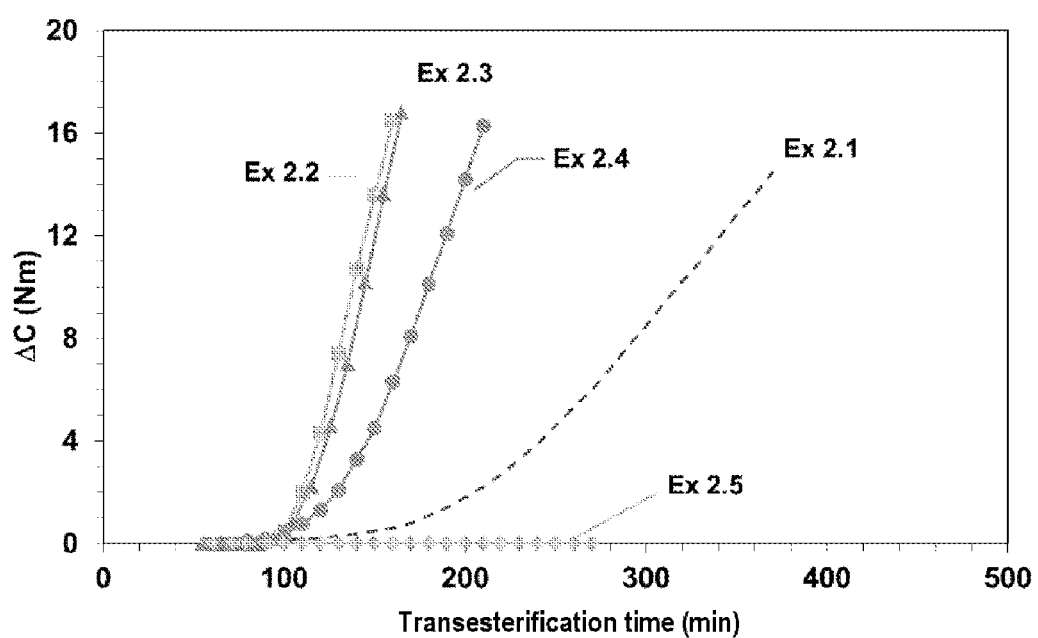
FIG. 2:
Variation of the torque AC during transesterification of poly(butylene succinate-co-butylene furanoate) containing different amounts of 2,5-furandicarboxylic acid monomer introduced into the reactor (dashed line: PBS, squares: 5 mol % BF, triangles: 10 mol % BF, dots: mol % BF and diamonds: 60 mol % BF). The transesterification temperature is 230° C., the molar ratio of zirconium catalyst to the diacid (total succinic acid+2,5-furandicarboxylic acid) is $1.8 \times 10^{-3}$.

Comparison of the Kinetics of a Process According to the Invention with a Process for Synthesis of PBS FIG. 2 presents the measurement of torque in a process according to the invention for different proportions of 2,5-furandicarboxylic acid comonomer (5, 10 and 20%) as a function of the transesterification time, compared with the torque measured for a process for synthesis of PBS in the absence of comonomer. The catalyst Zr(OBu)$_4$ is in a proportion such that the molar ratio of the sum of the diacids to the catalyst is $1.8 \times 10^{-3}$, and the transesterification temperature is 230° C.

The torque increases more rapidly for the polymers comprising 2,5-furandicarboxylic acid comonomer than for PBS alone. Thus, for example, a torque of 12 Nm is obtained after:
- about 140 minutes for 5% of 2,5-furandicarboxylic acid comonomer,
- about 150 minutes for 10% of 2,5-furandicarboxylic acid comonomer,
- about 190 minutes for 20% of 2,5-furandicarboxylic acid comonomer,
- and about 340 minutes for 0% of 2,5-furandicarboxylic acid comonomer.

This increase is characteristic of an acceleration of the kinetics of transesterification on adding the 2,5-furandicarboxylic acid comonomer.

The acceleration in polymerization kinetics is not at the expense of the quality of polymerization, since the polydispersity index obtained is 1.9 for PBS alone, 1.8 for PBS comprising 5 and 10% of 2,5-furandicarboxylic acid comonomer, and 1.9 for PBS comprising 20% of 2,5-furandicarboxylic acid comonomer. Moreover, the molecular weights obtained are:
- 59 000 g/mol for PBS,
- 58 200 g/mol for PBS comprising 5% of 2,5-furandicarboxylic acid comonomer,
- 59 200 g/mol for PBS comprising 10% of 2,5-furandicarboxylic acid comonomer, and
- 61 700 g/mol for PBS comprising 20% of 2,5-furandicarboxylic acid comonomer.

Figure 3:
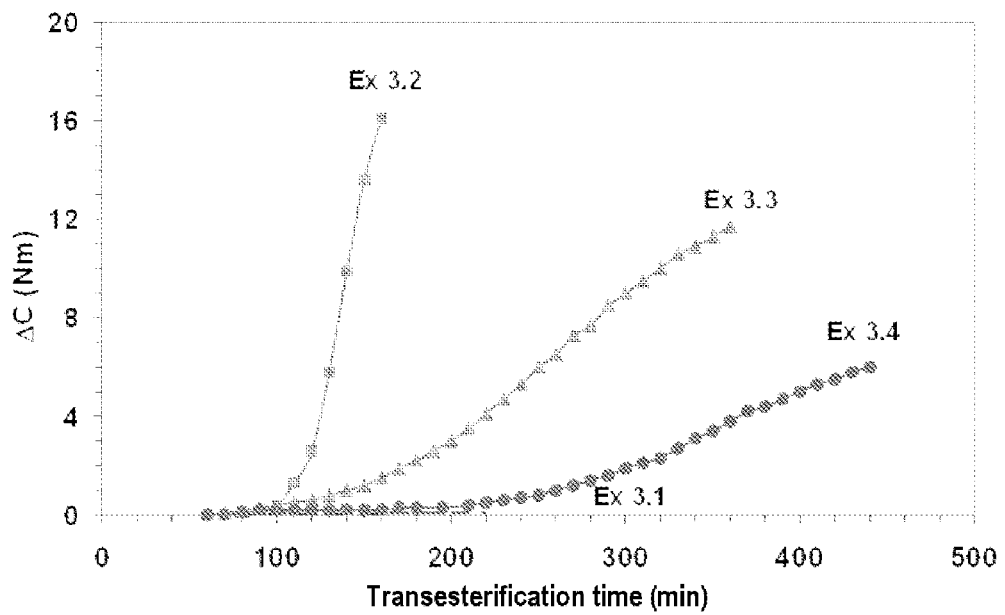
FIG. 3:
Variation of the torque AC during transesterification of poly(butylene succinate-co-butylene terephthalate) containing different amounts of terephthalic acid monomer introduced into the reactor (dashed line: 10 mol % BT (Zr catalyst), squares: 5 mol % BT (Zr catalyst), triangles: 10 mol % BT (Ti catalyst), dots: 20 mol % BT (Ti catalyst)). The experimental conditions of each of the syntheses are given in example 3.
Figure 4:
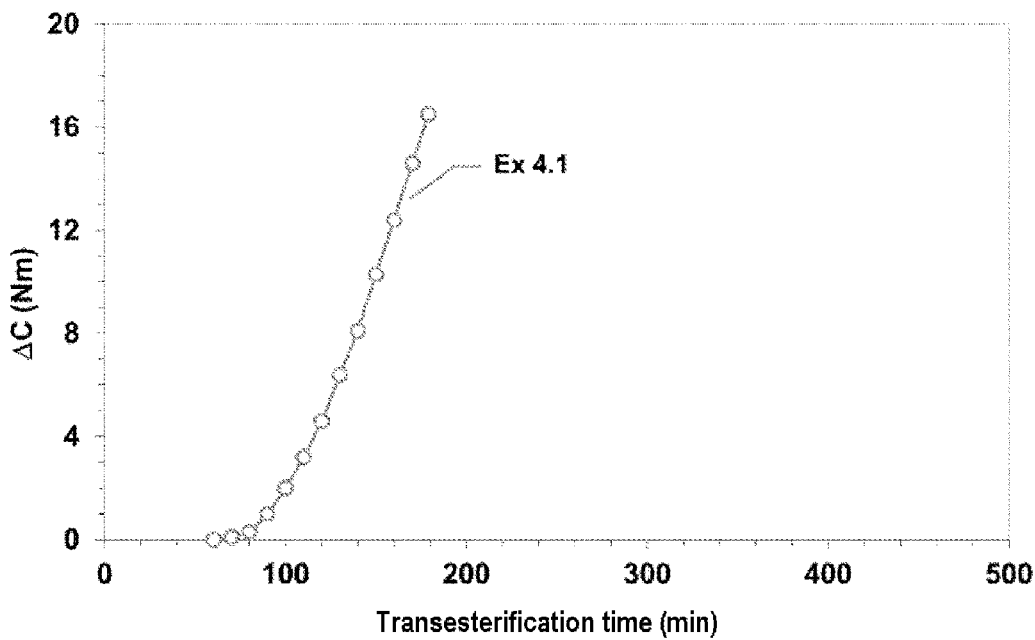
FIG. 4:
Variation of the torque AC during transesterification of poly(butylene sebacate-co-butylene furanoate) containing 20 mol % of 2,5-furandicarboxylic acid monomer introduced into the reactor. The transesterification temperature is 230° C., the molar ratio of titanium catalyst to the diacid (total sebacic acid+2,5-furandicarboxylic acid) is $2.1 \times 10^{-3}$.
Figure 5:
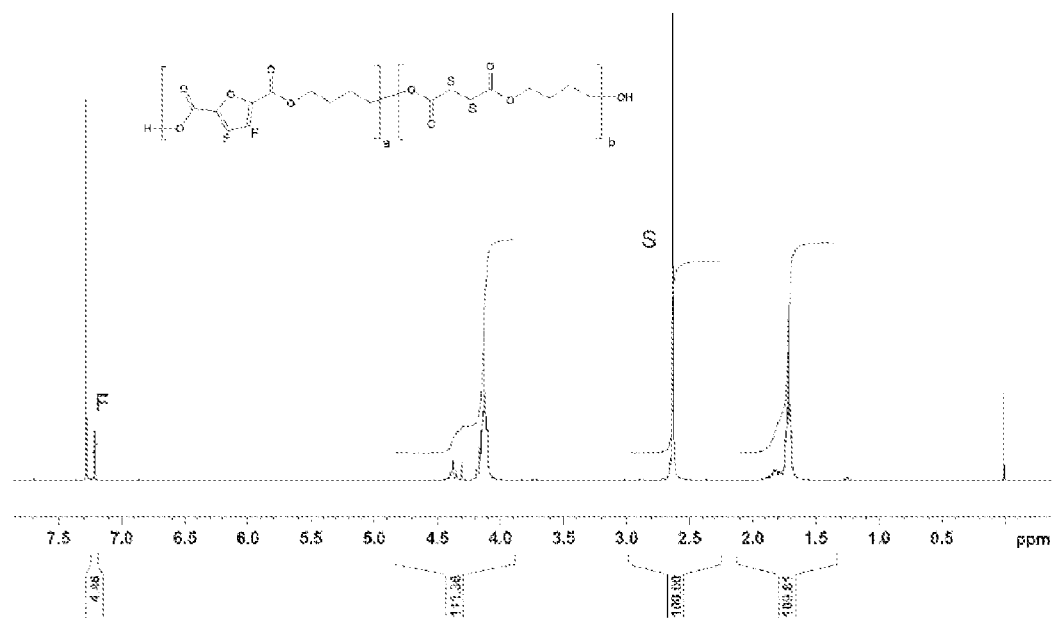
FIG. 5:
$^1$H NMR spectrum of poly(butylene succinate-co-butylene furanoate) obtained according to example 2.3.

For comparison, FIG. 3 presents measurement of the torque in a process for synthesis of PBS for different proportions of terephthalic acid comonomer (5, 10 and 20%), in different synthesis conditions (amount and type of catalyst and temperature) as a function of the transesterification time. The conditions used for each of the proportions had to be optimized for polymerization to take place. These conditions are as follows:

5%:—catalyst $Zr(OBu)_4$,
- molar ratio of the sum of the diacids to the catalyst $1.8 \times 10^{-3}$, and
- transesterification temperature 250° C.

10%:—catalyst $Ti(OBu)_4$,
- molar ratio of the sum of the diacids to the catalyst $1.4 \times 10^{-3}$, and
- transesterification temperature 250° C.

20%:—catalyst $Ti(OBu)_4$,
- molar ratio of the sum of the diacids to the catalyst $2.9 \times 10^{-3}$, and
- transesterification temperature 270° C.

In this case, adding the comonomer slows the esterification kinetics. Moreover, the polydispersity index changes from 1.9 for 5% of comonomer to 2.1 and 3.8 for 10 and 20% of comonomer, respectively. Furthermore, the molecular weight of the polymers obtained changes from 52 400 g/mol for 5% of comonomer to 49 700 and 34 900 g/mol for 10 and 20% of comonomer, respectively.

The invention claimed is:

1. A polymer comprising units derived from monomers comprising a 2,5-furandicarboxylic acid, at least one aliphatic diacid comprising 4 to 10 carbon atoms and at least one aliphatic diol comprising 2 to 8 carbon atoms, in which said polymer comprises:
    a mole fraction of units derived from 2,5-furandicarboxylic acid, relative to the sum of the moles of units derived from aliphatic diacids and from 2,5-furandicarboxylic acid, in the range from 2.5 to 35%;
    the mole fraction of the sum of the units derived from 2,5-furandicarboxylic acid and from aliphatic diacids, relative to the total of the units, being between 40 and 60%; and
    the mole fraction of the sum of the units derived from aliphatic diols, relative to the total of the units, being between 40 and 60%.

2. The polymer according to claim 1, wherein the aliphatic diacid is a linear saturated diacid and/or the aliphatic diol is a linear saturated diol.

3. The polymer according to claim 2, wherein the aliphatic diacid is succinic acid.

4. The polymer according to claim 2, wherein the aliphatic diol is 1,4-butanediol.

5. The polymer according to claim 1, wherein the mole fraction of units derived from 2,5-furandicarboxylic acid, relative to the sum of the moles of units derived from aliphatic diacids and from 2,5-furandicarboxylic acid, ranges from 5 to 30%.

6. The polymer according to claim 5, wherein the mole fraction of units derived from 2,5-furandicarboxylic acid, relative to the sum of the moles of units derived from aliphatic diacids and from 2,5-furandicarboxylic acid, ranges from 6 to 25%.

7. The polymer according to claim 5, wherein the mole fraction of units derived from 2,5-furandicarboxylic acid, relative to the sum of the moles of units derived from aliphatic diacids and from 2,5-furandicarboxylic acid, ranges from 7 to 20%.

8. The polymer according to claim 1, wherein the sum of the units derived from 2,5-furandicarboxylic acid, from aliphatic diacids and from aliphatic diols is above 90 mol % of the total units of the polymer.

9. The polymer according to claim 8, wherein the sum of the units derived from 2,5-furandicarboxylic acid, from aliphatic diacids and from aliphatic diols is above 95 mol % of the total units of the polymer.

10. The polymer according to claim 8, wherein the sum of the units derived from 2,5-furandicarboxylic acid, from aliphatic diacids and from aliphatic diols is 100 mol % of the total units of the polymer.

11. A process for preparing polymers according to claim 1, comprising:
    a step 1 of esterification between monomers of an aliphatic diacid, of 2,5-furandicarboxylic acid, and of an aliphatic diol, to form oligomers, and
    a step 2 of coupling, by transesterification, of the oligomers formed in the first step to form a polymer.

12. The process according to claim 11, wherein the aliphatic diacid is a linear saturated aliphatic diacid and/or the aliphatic diol is a linear saturated aliphatic diol.

13. The process according to claim 12, wherein the linear saturated diacid is succinic acid.

14. The process according to claim 12, wherein the linear saturated diol is 1,4-butanediol.

15. The process according to claim 11, wherein the 2,5-furandicarboxylic acid, the aliphatic diacid and/or the aliphatic diol is (are) derived from agricultural resources, or biosourced.

16. The process according to claim 11, wherein step 2 is carried out in the presence of a zirconium catalyst.

17. A polymer produced by a process according to claim 11.

18. A polymer composition comprising at least one polymer according to claim 17.

19. A film comprising a polymer according to claim 17.

20. A film comprising a polymer composition according to claim 18.

* * * * *

UNITED STATES PATENT AND TRADEMARK OFFICE
CERTIFICATE OF CORRECTION

PATENT NO. : 9,217,056 B2  
APPLICATION NO. : 14/388854  
DATED : December 22, 2015  
INVENTOR(S) : Nicolas Jacquel et al.

Page 1 of 1

It is certified that error appears in the above-identified patent and that said Letters Patent is hereby corrected as shown below:

Specification

Column 10,
Line 6, "(step of the process)" should read --(step 2 of the process)--.

Column 12,
Line 2, "torque AC" should read --torque $\Delta$C--.
Line 6, "dots: mol%" should read --dots: 20 mol%--.
Line 11, "torque AC" should read --torque $\Delta$C--.
Line 20, "torque AC" should read --torque $\Delta$C--.
Line 62, "calorimetry)" should read --Calorimetry)--.

Column 13,
Line 26, "torque AC" should read --torque $\Delta$C--.
Line 42, "torque AC" should read --torque $\Delta$C--.

Signed and Sealed this
Twenty-eighth Day of June, 2016

Michelle K. Lee
*Director of the United States Patent and Trademark Office*